US012470019B2

(12) United States Patent
Ni et al.

(10) Patent No.: US 12,470,019 B2
(45) Date of Patent: Nov. 11, 2025

(54) PLUG CONNECTOR SOCKET ENGAGEMENT COMPONENT

(71) Applicant: Tyco Electronics (Shanghai) Co., Ltd., Shanghai (CN)

(72) Inventors: Hongjian (Neil) Ni, Shanghai (CN); Zhaohai (Tim) Xue, Shanghai (CN); Xinjie (David) Zhang, Kunshan (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 459 days.

(21) Appl. No.: 17/941,165

(22) Filed: Sep. 9, 2022

(65) Prior Publication Data

US 2023/0076634 A1 Mar. 9, 2023

(30) Foreign Application Priority Data

Sep. 9, 2021 (CN) ........................ 202122185630.9

(51) Int. Cl.

*H01R 13/633* (2006.01)
*H01R 12/51* (2011.01)
*H01R 13/516* (2006.01)

(52) U.S. Cl.

CPC ......... *H01R 13/6335* (2013.01); *H01R 12/51* (2013.01); *H01R 13/516* (2013.01)

(58) Field of Classification Search

CPC ............... H01R 12/51–13/516; H01R 13/6335
See application file for complete search history.

(56) References Cited

U.S. PATENT DOCUMENTS

| | | | | |
|---|---|---|---|---|
| 8,506,319 | B2 * | 8/2013 | Ritter | H01R 13/6275 439/352 |
| 9,979,127 | B2 * | 5/2018 | Zhang | H01R 13/62938 |
| 10,998,684 | B2 | 5/2021 | Chen et al. | |
| 2021/0175650 | A1 * | 6/2021 | Hsiao | H01R 12/777 |

* cited by examiner

*Primary Examiner* — Vanessa Girardi
(74) *Attorney, Agent, or Firm* — Barley Snyder

(57) ABSTRACT

A plug connector includes a plug housing having a plurality of side walls forming a cavity, a spacer having a plate shape and dividing the cavity into a pair of halves, a plurality of conductive terminals disposed on opposite sides of the spacer, a connector engagement component, and a pull tab. The connector engagement component has a first engagement portion releasably engaging a second engagement portion of a socket connector and a fixing portion detachably secured to the side walls of the plug housing. The pull tab is movable between the plug housing and the connector engagement component in a direction towards or away from a cable connected to the conductive terminals. Pulling of the pull tab in a pulling direction towards the cable enables release of an engagement between the first engagement portion and the second engagement portion, separating the plug connector from the socket connector.

20 Claims, 8 Drawing Sheets

PLUG CONNECTOR SOCKET ENGAGEMENT COMPONENT

CROSS-REFERENCE TO RELATED APPLICATIONS

This application claims the benefit of the filing date under 35 U.S.C. § 119(a)-(d) of Chinese Patent Application No. 202122185630.9, filed on Sep. 9, 2021.

FIELD OF THE INVENTION

The present disclosure generally relates to a plug connector and a connector assembly including the plug connector and a socket connector.

BACKGROUND

In the related art, a socket connector is installed on a circuit board together with a data connector (such as a wire-to-board connector) for data transmission; a mating card must satisfy specification requirements for the socket connector and the data transmission connector. However, a conventional socket connector is usually a card edge connector, for example, which cannot be assembled with a cable. When a user needs to use a cable for electrical connection with other devices, such a socket connector cannot be used. This makes the socket connector less flexible in application.

In addition, some existing plug connectors and socket connectors mating thereto, after being connected, are easily disconnected from each other, easily resulting in circuit breakage and safety accidents. Moreover, the existing connector assembly has a poor heat dissipation performance, also easily resulting in safety accidents. In the existing plug connector, a cable and a conductive terminal of the plug connector are connected by physical overlapping, which results in a relatively large size of the plug connector and a poor firmness between the cable and the conductive terminal. When a user separates the plug connector from the socket connector by pulling the cable, it is easy to separate the cable from the conductive terminal of the plug connector. In addition, when a user needs to pull out a plug connector located in a narrow space, it is difficult to clamp the plug connector and pull out the same, and pulling the cable can result in disconnection between the cable and the conductive terminal of the plug connector.

SUMMARY

A plug connector includes a plug housing having a plurality of side walls forming a cavity, a spacer having a plate shape and dividing the cavity into a pair of halves, a plurality of conductive terminals disposed on opposite sides of the spacer, a connector engagement component, and a pull tab. The connector engagement component has a first engagement portion releasably engaging a second engagement portion of a socket connector and a fixing portion detachably secured to the side walls of the plug housing. The pull tab is movable between the plug housing and the connector engagement component in a direction towards or away from a cable connected to the conductive terminals. Pulling of the pull tab in a pulling direction towards the cable enables release of an engagement between the first engagement portion and the second engagement portion, separating the plug connector from the socket connector.

BRIEF DESCRIPTION OF THE DRAWINGS

The present invention will become more apparent by describing in detail exemplary embodiments thereof with reference to the accompanying drawings, in which.

DETAILED DESCRIPTION OF THE EMBODIMENTS

Figure 1:
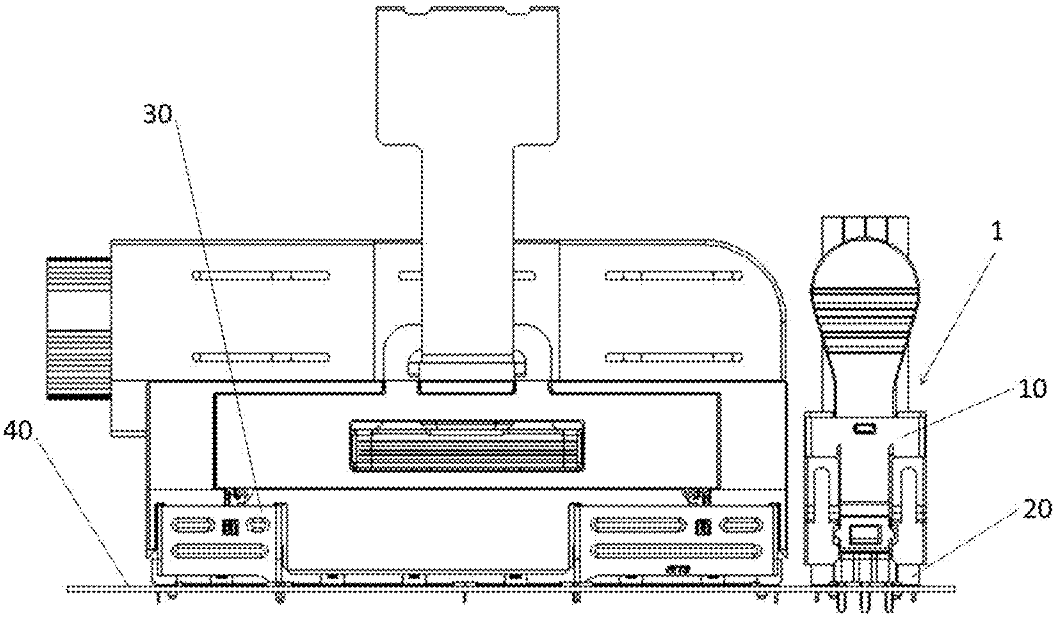
FIG. 1 is a front view of a connector assembly including a plug connector and a socket connector according to an embodiment.

Hereinafter, embodiments of the present disclosure will be described with reference to the accompanying drawings. The same reference numerals and symbols shown in the drawings of the present disclosure refer to elements or components performing substantially the same function.

In the following detailed description, the terms such as "front", "rear", "upper", "lower", "left", "right", "top" and "bottom" and the like are defined by the drawings, however shapes of and locations of the components are not limited by these terms.

In the context of the present disclosure, the "plugging direction" refers to a direction in which a plug connector is plugged into a socket connector, which is indicated by "X" in the drawings; and the "pulling direction" refers to a direction in which a pull tab is pulled towards a cable so as to separate the plug connector from the socket connector, which is indicated by "X'" in the drawings. The pulling direction X' is opposite to the plugging direction X. The longitudinal directions of the plug connector and of the socket connector are parallel to the pulling direction X' and the plugging direction X. The "raising direction" refers to a direction in which a first engagement portion of the connector engagement component is raised up by the pull tab to move away from an outer surface of a plug housing 11 when the pull tab is pulled towards the cable, which is indicated by "Z" in the drawings, and the raising direction Z is perpendicular to the pulling direction X' and the plugging direction X. The "lateral direction" refers to a direction perpendicular to the raising direction Z as well as the pulling direction X' and the plugging direction X (or the longitudinal direction), which is indicated by "Y" in the drawings.

Furthermore, the terminology used herein is intended to describe the embodiments, and is not intended to limit and/or constrain the present disclosure. The singular forms "a", "an", "the" and "said" are intended to include the plural forms as well, unless the context clearly dictates otherwise. In the present disclosure, the terms such as "comprise", "include", "have" and the like, are intended to specify the presence of stated features, number, steps, operations, elements, components and combinations thereof, but do not preclude the presence or addition of one or more other features, number, steps, operations, elements, components and combinations thereof.

Although the terms such as "first", "second" and the like are used herein to describe various elements, these elements should not be limited by these terms. These terms are only intended to distinguish one element from another. For example, a first element would be termed a second element, and a second element would be termed a first element, without departing from the scope of the present disclosure. The term "and/or" includes a plurality of combinations of associated items or any one of a plurality of the associated items.

In the following detailed description, for convenience of illustration, numerous specific details are set forth in order to provide a thorough understanding of the disclosed embodiments. However, one or more embodiments may be embodied without these specific details. In other instances, well-known structures and devices are shown in schematic form in order to simplify the drawings.

FIG. 1 shows a front view of a connector assembly including a plug connector and a socket connector, independent of a data transmission purpose connector, according to an embodiment of the present disclosure.

As shown in FIG. 1, the connector assembly 1 according to the present disclosure is independent of a data transmission purpose connector 30. Therefore, the connector assembly 1 is not limited by the specific structure and specification of the data transmission purpose connector to be mated therewith. The connector assembly 1 includes a plug connector 10 and a socket connector 20 mating with each other. The socket connector 20 may be mounted onto a circuit board 40 and connected with a corresponding power supply device, while the plug connector 10 is configured to be connected to a cable and plugged into the socket connector 20. The socket connector 20 may be a card edge type connector such that a side edge or a connection edge of a card (e.g., a board card such as a data acquisition card, a motion control card, a video acquisition card, etc.) may connected to both the socket connector 20 and the data transmission purpose connector 30 at the same time, so as to transmit both data and electric current. Also when a cable needs to be used to electrically connect the socket connector 20 with other devices, the plug connector 10 connected with the cable can be plugged into the socket connector 20 to realize the connection or assembly between the cable and the socket connector.

Figure 2:
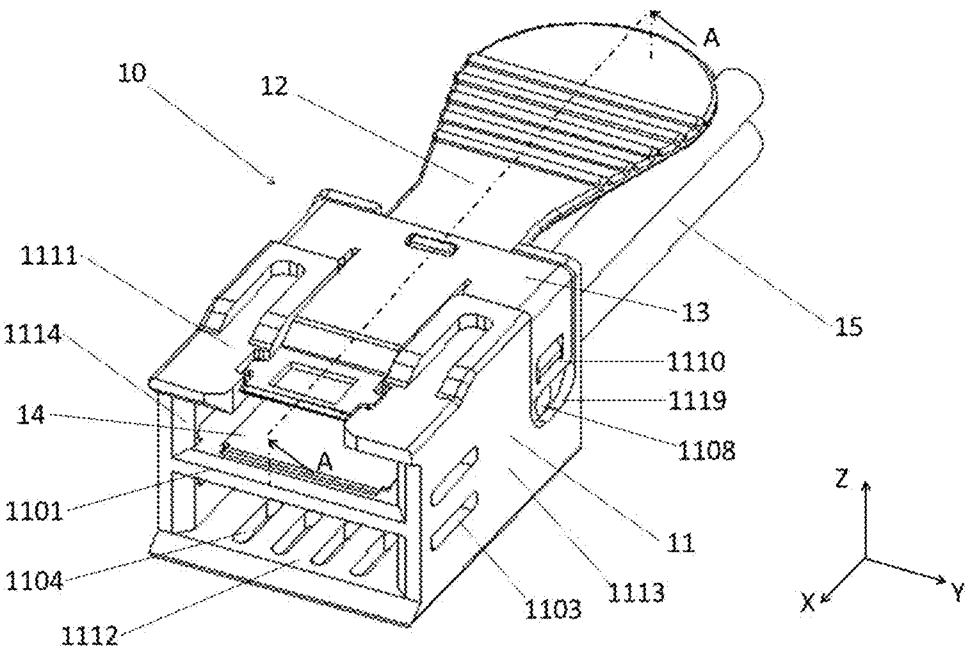
FIG. 2 is a perspective view of the plug connector.
Figure 3:
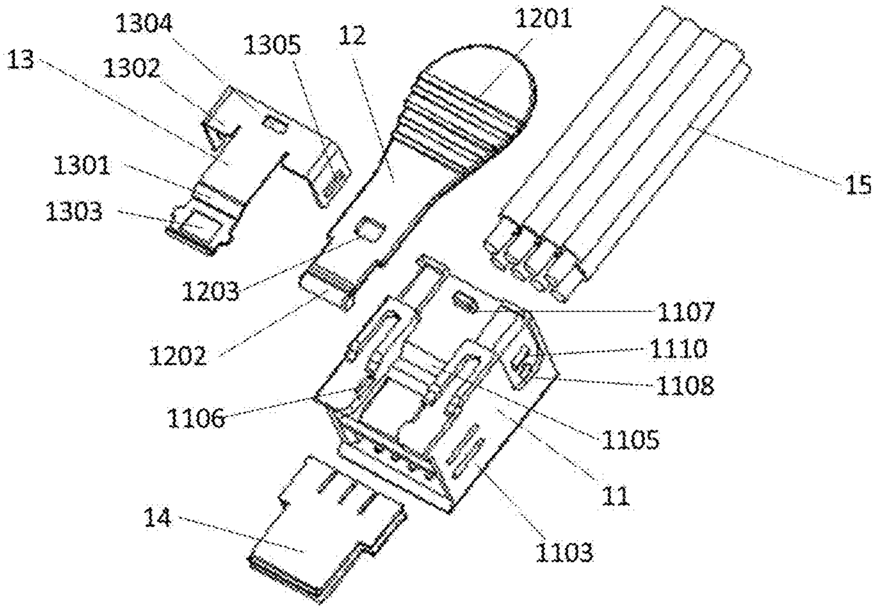
FIG. 3 is an exploded perspective view of the plug connector.

As shown in FIGS. 2 and 3, a plug connector 10 according to an exemplary embodiment of the present disclosure includes a plug housing 11, a plug conductive terminal 14, a pull tab 12, and a connector engagement component 13. The plug conductive terminal 14 is disposed inside the plug housing 11 and can be fixedly connected with a cable 15.

As shown in FIG. 3, the pull tab 12 has a handle-held portion 1201 and a pull tab expanded portion 1202. The connector engagement component 13 has a fixing portion 1302 detachably fixed to the plug housing 11 and a first engagement portion 1301 extending perpendicularly to the fixing portion 1302. The first engagement portion 1301 is configured to releasably engage a second engagement portion 2101 of the socket connector 20 mated with the plug connector. The pull tab 12 is arranged to be movable between the plug housing 11 and the connector engagement component 13 in the direction towards or away from the cable. By pulling the pull tab 12 in a pulling direction X' opposite to the plugging direction, the pull tab expanded portion 1202 raise up the first engagement portion 1301 of the connector engagement component 13 in a raising direction Z (perpendicular to the pulling direction). This moves the first engagement portion 1301 away from the outer surface of the plug housing 11, so that the engagement between the first engagement portion 1301 and the second engagement portion 2101 of the socket connector 20 is released, thereby separating the plug connector 10 from the socket connector 20.

In an embodiment, the plug housing 11 is made of an insulating material such as plastic. As shown in FIG. 2, the plug housing 11 includes a first side wall 1111 facing the pull tab 12, a second side wall 1112 opposite to the first side wall 1111, and a third side wall 1113 and a fourth side wall 1114 connecting the first side wall 1111 and the second side wall 1112.

A plug conductive terminal 14 is housed inside the plug housing 11, as shown in FIG. 2, and the plug conductive terminal 14 may be connected with a cable 15. The cable 15 may be an electrical wire for transmitting electrical signals, or an optical fiber for transmitting optical signals, etc., which is not limited in the present disclosure.

In an exemplary embodiment, the plug conductive terminal 14 and the cable 15 are connected by welding, so that there is a firm welding connection between the plug conductive terminal 14 and the cable 15. Even if a user separates the plug connector 10 from the socket connector 20 by pulling the cable 15 under a special circumstance, the cable 15 will not be separated from the plug conductive terminal 14. Furthermore, the size of the plug connector can be significantly reduced by use of welding connection. In another optional embodiment, the plug conductive terminal 14 and the cable 15 are connected by conductive glue. In other optional embodiments, the cable 15 is pressed and connected onto the plug conductive terminal 14.

In another exemplary embodiment, a spacer 1101 is provided between the third side wall 1113 and the fourth side wall 1114, inside the plug housing 11, as shown in FIG. 2. The spacer 1101 may be integrally formed with the plug housing 11. Alternatively, the spacer 1101 may be formed separately from the plug housing 11, in which case the spacer 1101 may be inserted into the plug housing 11. As an example, the spacer 1101 has a substantially flat plate shape, and extends in the longitudinal direction and the lateral direction. The spacer 1101 is disposed in the middle of a cavity formed by the side walls 1111-1114 of the plug housing 11, so as to divide the cavity formed by the side walls 1111-1114 into two halves having approximately equal sizes.

Figure 4:
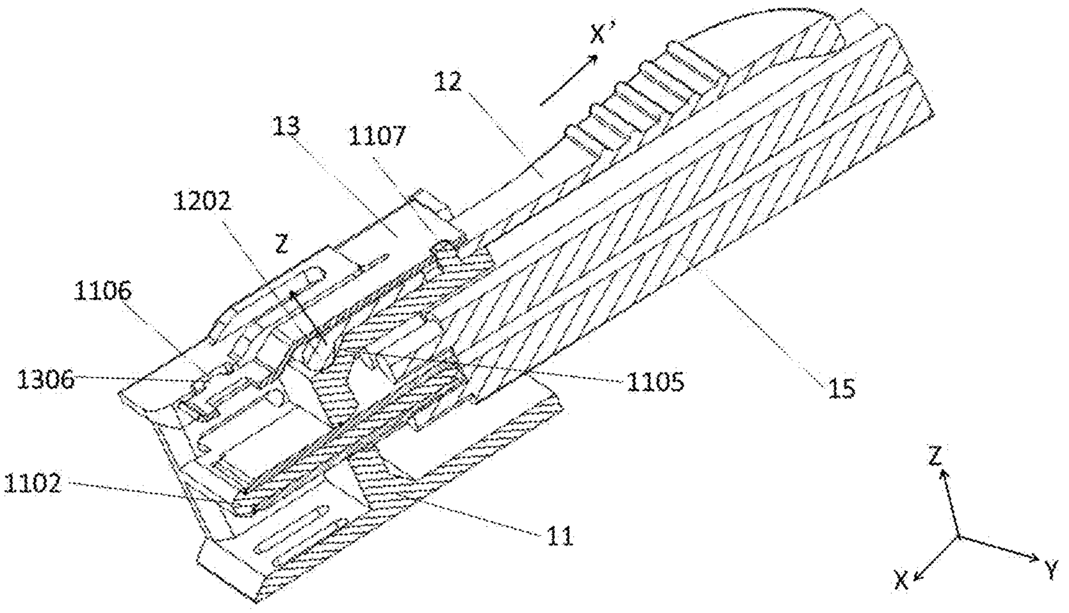
FIG. 4 is a sectional perspective view of the plug connector, taken along line A-A in FIG. 2.

The plug conductive terminals 14 may be in a sheet shape and are disposed on two opposite sides of the spacer 1101. In an exemplary example, the plug conductive terminal 14 may be pasted onto two opposite sides of the spacer 1101. In addition, as best shown in FIG. 4, a raised portion 1102 is provided at an end of the spacer 1101 opposite to the end connected with the cable 15. The raised portion 1102 can abut against the plug conductive terminal 14, so that when the plug connector 10 is pulled out, the raised portion 1102 can stop the plug conductive terminal 14. This prevents the plug conductive terminal 14 from being separated by sliding from the spacer 1101 in a direction towards the socket connector 20 when the plug connector 10 is separated from the socket connector 20.

As best shown in FIGS. 2, 3, 11 and 16, the plug housing 11 is provided with ventilation holes 1103, 1104, which can dissipate heat from the connector assembly 1, preventing too much high temperature of the connector assembly 1, thereby increasing the safety performance. In an exemplary embodiment, ventilation holes 1103 are respectively provided in the two side walls 1113 and 1114 connected by the spacer 1101 of the plug housing 11. In an exemplary embodiment shown in FIG. 2, the third side wall 1113 and the fourth side wall 1114 are respectively provided with two ventilation holes 1103, which have an elongated shape extending in the longitudinal direction, and are located on two opposite sides of the spacer 1101, such as being spaced apart by the spacer 1101. In addition, a ventilation hole 1104 may be further provided in the second side wall 1112 of the plug housing 11 facing the spacer 1101. As shown in FIG. 2, four ventilation holes 1104 are provided, which have elongated shape extending in the longitudinal direction. However, it should be understood that the number, shape and extension direction of the ventilation holes 1103 and 1104 are not limited in the present disclosure.

As best shown in FIG. 2 and FIG. 3, in an optional embodiment, at least one side wall of the plug housing 11 is provided with a glue injection hole 1108, through which conductive glue can be injected into the connection between the cable 15 and the plug conductive terminal 14, so as to further strengthen the connection therebetween.

As shown in FIGS. 2 to 6, a connector engagement component 13 is detachably fixed to the outside of the plug housing 11. The connector engagement component 13 may be made of an elastic material. The connector engagement component 13 has a first engagement portion 1301 extending in a direction away from the cable and a fixing portion 1302 perpendicular to the first engagement portion 1301, the fixing portion 1302 being detachably fixed to the plug housing 11. The first engagement portion 1301 of the connector engagement component 13 releasably engages the second engagement portion 2101 of the socket connector 20 mated with the plug connector 10. In the illustrated embodiments, the first engagement portion 1301 has a tongue-shape extending in a direction opposite to the pulling direction.

Figure 14:
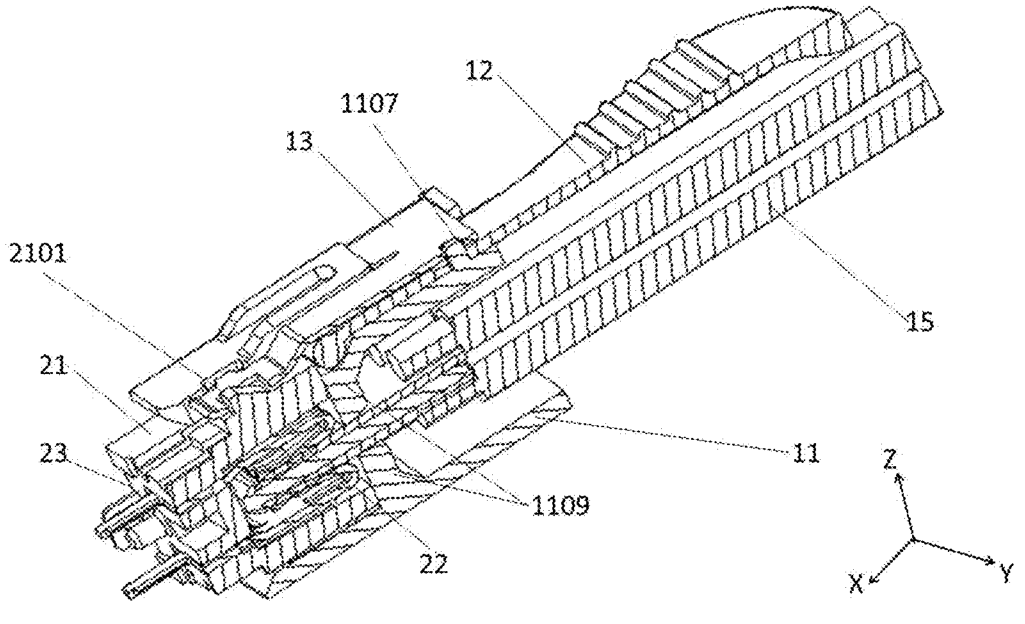
FIG. 14 is a sectional perspective view of the plug connector connected with the socket connector, taken along line E-E of FIG. 11.
Figure 15:
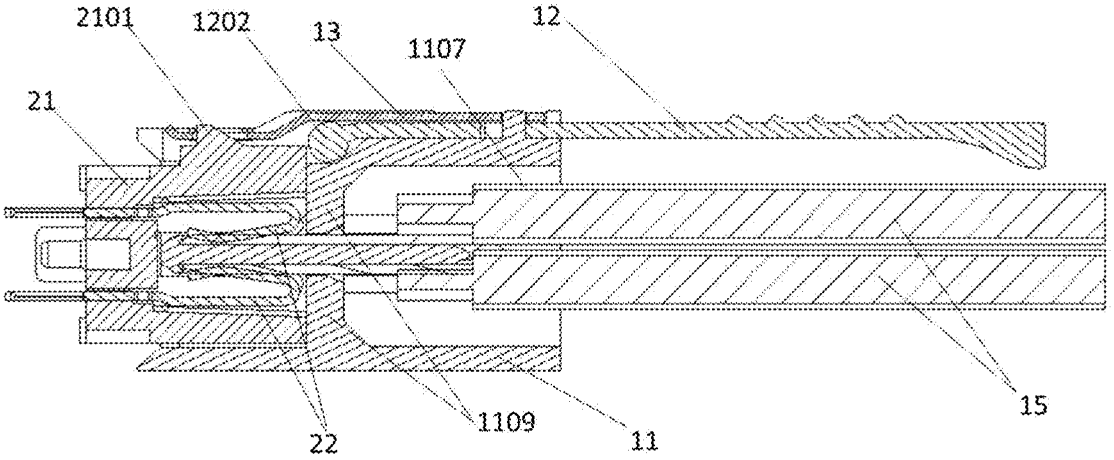
FIG. 15 is a sectional side view of the plug connector connected with the socket connector, taken along line E-E of FIG. 11.

In the illustrated exemplary embodiments, the first engagement portion 1301 is provided with an engagement opening 1303, shown in FIG. 3, and correspondingly, the second engagement portion 2101 of the socket connector 20 is formed as a protruding portion, shown in FIGS. 7-10, which is sized to fit in the engagement opening 1303. When the plug connector 10 is electrically connected with the socket connector 20, the protruding portion 2101 is positioned in the engagement opening 1303, as shown in FIGS. 14 and 15, so that the plug connector 10 and the socket connector 20 are connected firmly with each other. In another embodiment, the first engagement portion 1301 may be provided with a protruding portion, and correspondingly, the second engagement portion 2101 of the socket connector 20 may be a recess provided in a side wall of the socket connector. The protruding portion of the first engagement portion 1301 has a size matching that of the recess of the socket connector 20. When the plug connector 10 is electrically connected to the socket connector 20, the protruding portion of the first engagement portion 1301 is positioned in the recess of the socket connector 20.

In an embodiment, shown in FIG. 4, lateral protruding portions 1306 are provided on both sides of the first engagement portion 1301, and correspondingly, guiding recesses 1106 are provided in the side wall of the plug housing 11 facing the connector engagement component 13. The guiding recess 1106 can guide the lateral protruding portion 1306 of the first engagement portion 1301 to move in the guiding recess 1106 in a direction away from the outer surface of the plug housing 11. In an exemplary example, a limiting portion is provided at the bottom of the guiding recess 1106 to limit a moving distance of the first engagement portion 1301 toward the inside of the plug housing 11.

Figure 5:
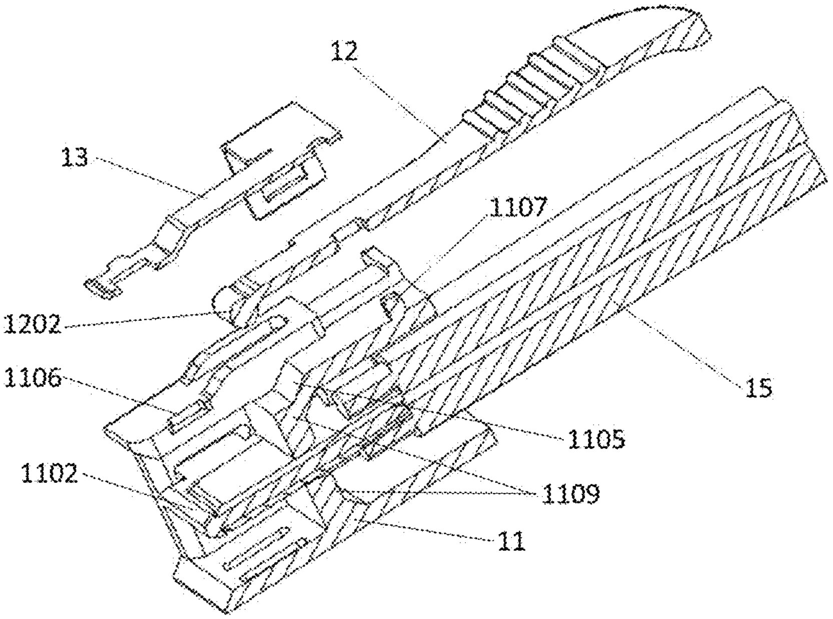
FIG. 5 is a sectional exploded perspective view of the plug connector.

In an embodiment, a position limiting portion 1109 is provided inside the plug housing 11, as shown in FIG. 5, which may limit an engagement depth between the plug connector 10 and the socket connector 20. In this way, on the one hand, the socket connector 20 is prevented from excessively entering the inside of the plug connector 10, and on the other hand, the first engagement portion 1301 (e.g., an engagement opening and/or a protruding portion) and the corresponding second engagement portion 2101 (e.g., a protruding portion and/or a recess) of the socket connector 20 may just fit with each other when the socket connector 20 is connected with the plug connector 10.

In the illustrated exemplary embodiments, the fixing portion 1302 of the connector engagement component 13 has wings, as shown in FIG. 3, which may be bent towards and fixed to the plug housing 11. In an exemplary embodiment, a wing opening 1305 is provided in the wing, and a protruding portion 1110 is provided on the outer surface of the first side wall 1111 of the plug housing 11. The wing opening 1305 can be snap-engaged with the protruding portion 1110 of the plug housing 11 (see FIG. 2), thereby preventing accidental separation of the connector engagement component 13 from the plug housing 11.

In an embodiment shown in FIG. 2, grooves 1119 are provided on the outer surfaces of the third side wall 1113 and the fourth side wall 1114 of the plug housing 11, and the fixing portion 1302 of the connector engagement component 13 can be positioned in the groove 1119, thereby reducing the size of the plug connector 10. The groove 1119 may have a size larger than the size of the fixing portion 1302, so as to facilitate the positioning of the fixing portion 1302 in the groove 1119, and also facilitate the separation of the fixing portion 1302 from the groove 1119.

Figure 6:
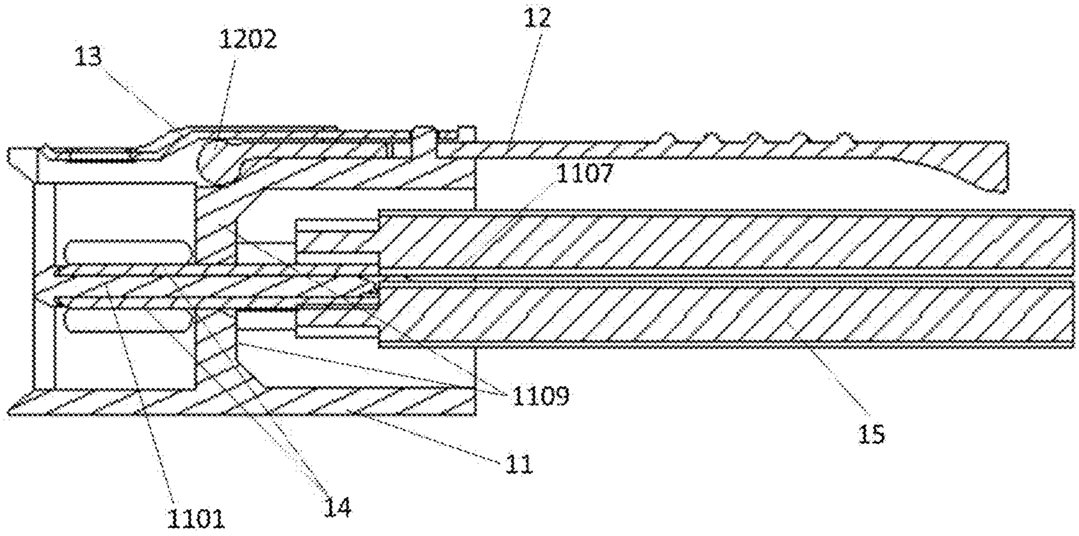
FIG. 6 is a sectional side view of the plug connector, taken along line A-A in FIG. 2.
Figure 7:
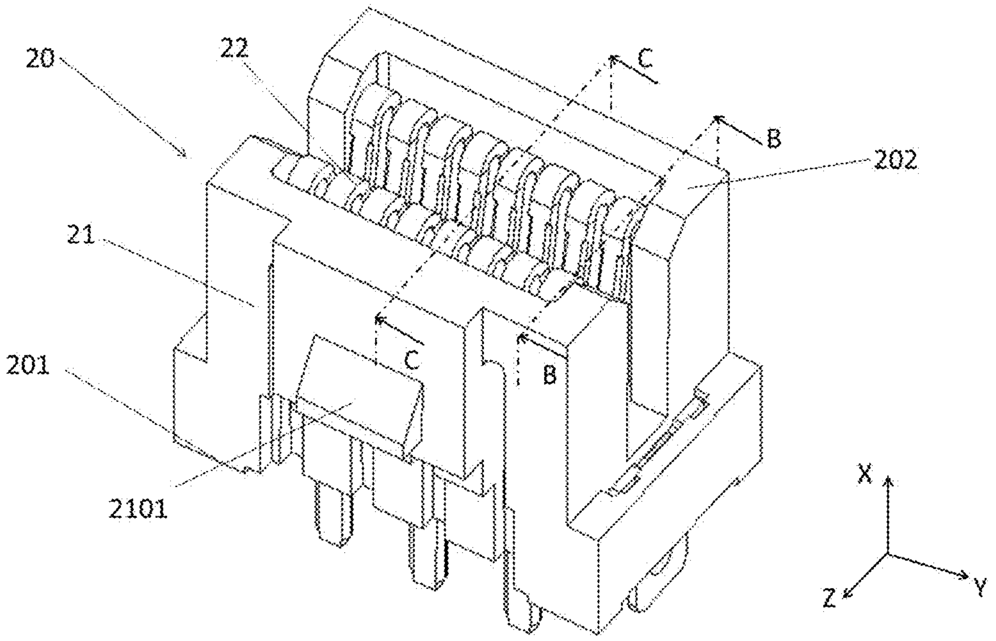
FIG. 7 is a perspective view of a socket connector according to an embodiment.
Figure 8:
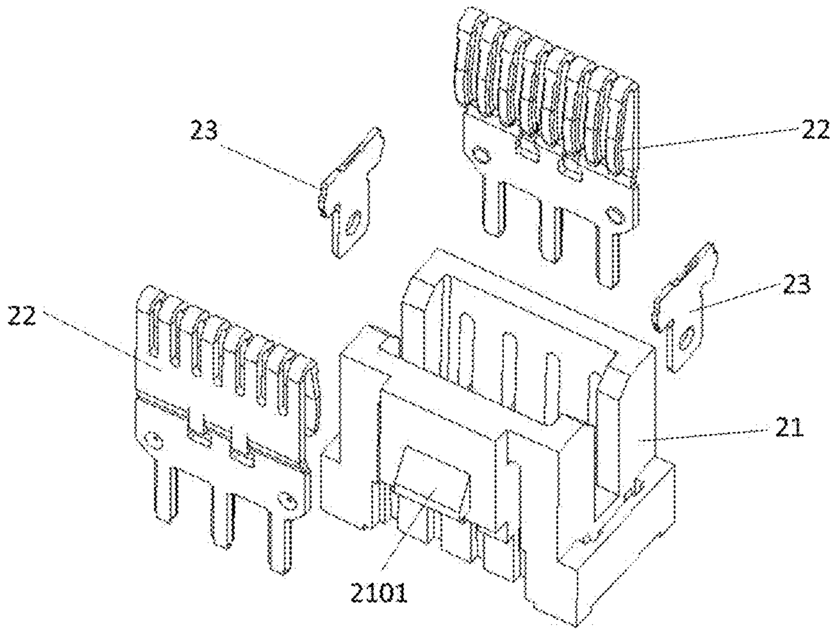
FIG. 8 is an exploded perspective view of the socket connector.

In the illustrated exemplary embodiments, the pull tab 12 has a handle-held portion 1201 and a pull tab expanded portion 1202, where the pull tab expanded portion 1202 is provided at an end of the pull tab 12 opposite to the handle-held portion 1201 and has rigidity. As best shown in FIGS. 4 to 6, the pull tab expanded portion 1202 has a cylindrical shape extending in the lateral direction Y perpendicular to the longitudinal direction. The pull tab expanded portion 1202 has a thickness greater than the thickness of the body of the pull tab 12. According to an exemplary embodiment of the present disclosure, the pull tab 12 is movably arranged between the outer surface of the plug housing 11 (or the outer surface of the first side wall) and the inner surface of the connector engagement component 13.

By pulling the pull tab 12 in the pulling direction X' toward the cable 15, the pull tab expanded portion 1202 can raise up the first engagement portion 1301 of the connector engagement component 13 in the raising direction Z to cause the first engagement portion 1301 to move away from the outer surface of the plug housing 11, thereby releasing the engagement of the first engagement portion 1301 with the second engagement portion 2101 of the socket connector 20. The plug connector 10 can be disconnected from the socket connector 20 by further pulling. In this way, even if the plug connector 10 is located in a narrow space, a user can easily separate the plug connector 10 from the socket connector 20 by pulling the pull tab 12.

In the illustrated embodiments, the handle-held portion 1201 of the pull tab 12 extends in the pulling direction X' towards the cable 15, and the surface of the handle-held portion 1201 is provided to be uneven so as to facilitate pulling of the pull tab 12 without slipping.

In an exemplary embodiment, as best shown in FIGS. 4 and 5, the first side wall of the plug housing 11 facing the pull tab 12 is provided with a guiding ramp 1105. The space formed between an outer surface of the guiding ramp 1105 facing the connector engagement component 13 and the inner surface of the connector engagement component 13 is tapered in the pulling direction X'. After the plug connector 10 is connected or mated with the socket connector 20, the pull tab expanded portion 1202 is arranged in the space between the outer surface of the guiding ramp 1105 and the inner surface of the first engagement portion 1301 of the connector engagement component 13. When the user pulls the pull tab 12 in the pulling direction X' to separate the plug connector 10 from the socket connector 20, the pull tab expanded portion 1202 is moved along the guiding ramp 1105 in the pulling direction X' toward the cable, and the first engagement portion 1301 will be raised up, so that the first engagement portion 1301 (e.g., the engagement opening and/or the protruding portion) is disengaged from the corresponding second engagement portion 2101 (e.g., the protruding portion and/or the recess) of the socket connector 20, and the plug connector 10 will be separated from the socket connector 20 by further pulling.

In an exemplary embodiment shown in FIGS. 2 to 6, a pull tab opening 1203 is provided in the body of the pull tab 12, and a plug housing protruding portion 1107 is provided on the outer surface of the first side wall 1111 of the plug housing 11. The plug housing protruding portion 1107 is positioned in the pull tab opening 1203. As an example, the size of the pull tab opening 1203 in a direction parallel to the pulling direction is larger than the size of the plug housing protruding portion 1107 in the direction parallel to the pulling direction, so that the pull tab 12 can be moved in the pulling direction. By virtue of the interaction between the pull tab opening 1203 and the plug housing protruding portion 1107, that is, by virtue of a limiting effect of the plug housing protruding portion 1107 on the pull tab 12, it is possible to avoid an accidental separation of the pull tab 12 from the plug housing 11 when pulling the pull tab 12.

Further, a fixing portion opening 1304 may be provided in the fixing portion of the connector engagement component 13, and the plug housing protruding portion 1107 is further positioned in the fixing portion opening 1304, as shown in FIG. 4. The fixing portion opening 1304 may be sized and shaped to match (e.g., have approximately the same cross-sectional size and shape) with the size and shape of the plug housing protruding portion 1107, e.g., to enable secure engagement (e.g., shape fitting) therebetween, so that the fixing portion 1302 of the connector engagement component 13 is more stably fixed onto the plug housing. For example, the pull tab 12, when being pulled, moves in the pulling direction relative to the fixing portion 1302 of the connector engagement component and the plug housing protruding portion 1107.

As shown in FIGS. 7 to 10, the present disclosure provides a socket connector 20, which is mated with the plug connector 10 mentioned above. The socket connector 20 is a card edge type connector or a board-to-board connector, suitable for connecting a circuit board (e.g., a PCB of a power supply device) and a card having a connection edge. The socket connector 20 has a fixing connection end 201 electrically connected with a circuit board 40 and an engagement end 202 electrically connected with a connection edge of a card.

The socket connector 20 has a connector housing 21 and a connector conductive terminal 22 arranged inside the connector housing 21, and a pin 221 of the connector conductive terminal 22 protrudes from the connector housing 21, so as to electrically connect with an external power supply device (e.g., a circuit board 40 of the power supply device). In another embodiment, the socket connector 20 may further include a connector fixing component 23, which can be embedded in the socket connector 20 and protruded out from the socket connector 20 so as to firmly fix the socket connector 20 onto a corresponding external power supply device.

According to an embodiment of the present disclosure, an outer side of the connector housing 21 is provided with a second engagement portion 2101, such as a protruding portion or a recess, which can be mated and engaged with a corresponding engagement opening or a protruding portion of the first engagement portion of the plug connector 10. In the illustrated exemplary embodiments, the second engagement portion 2101 of the connector housing 21 is formed as a protruding portion, and the protruding portion is engaged with the engagement opening of the plug connector 10 when the plug connector 10 is connected to the socket connector 20, so that the plug connector 10 and the socket connector 20 are firmly connected with each other.

Figure 9:
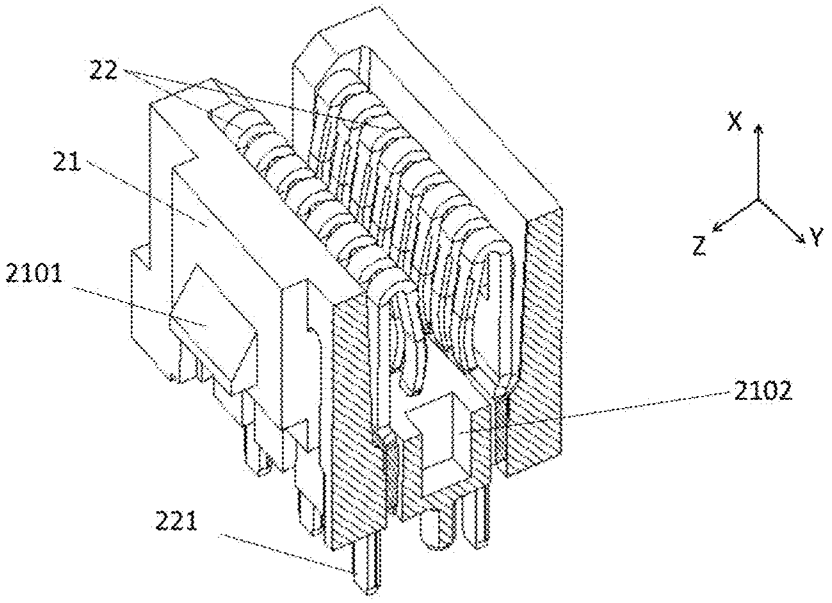
FIG. 9 is a sectional perspective view of the socket connector, taken along line B-B of FIG. 7.
Figure 10:
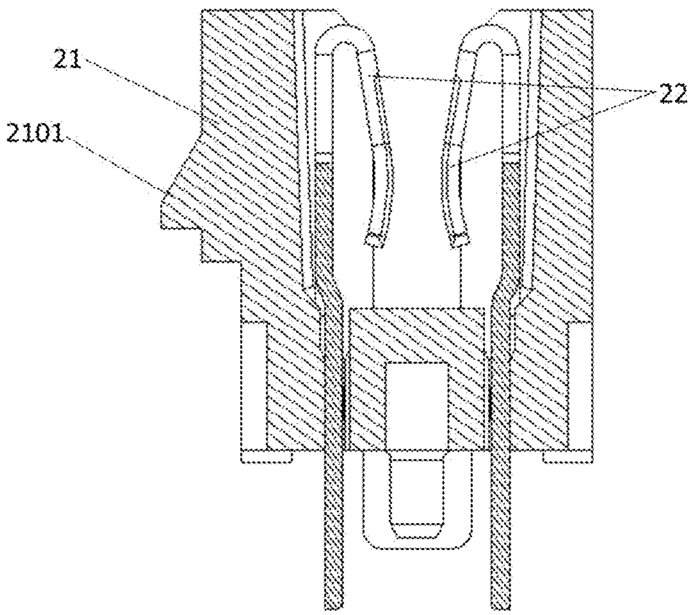
FIG. 10 is a sectional side view of the socket connector, taken along line C-C of FIG. 7.
Figure 11:
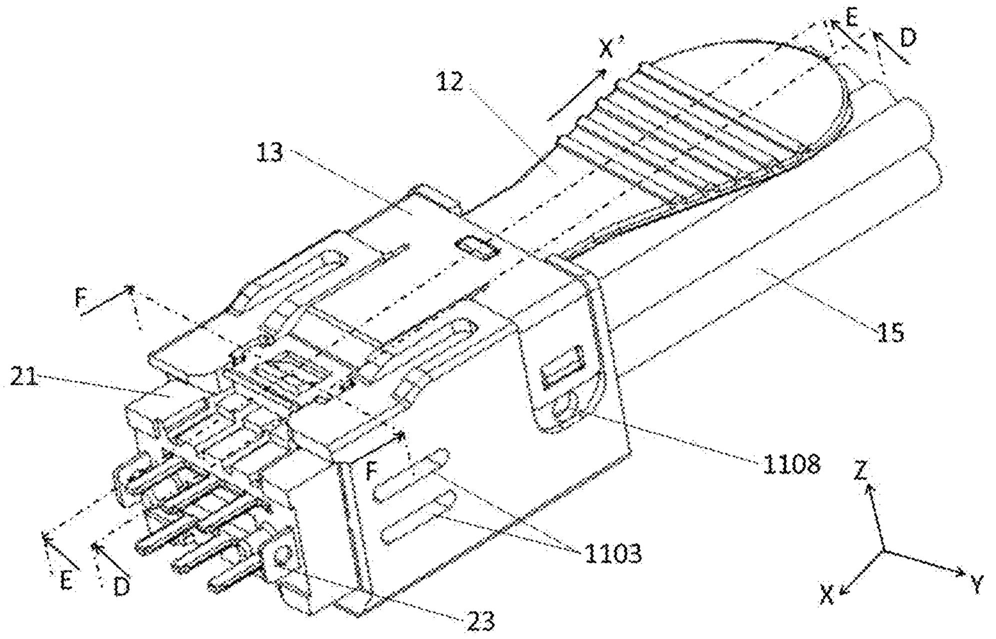
FIG. 11 is a perspective view of the plug connector connected with the socket connector.
Figure 12:
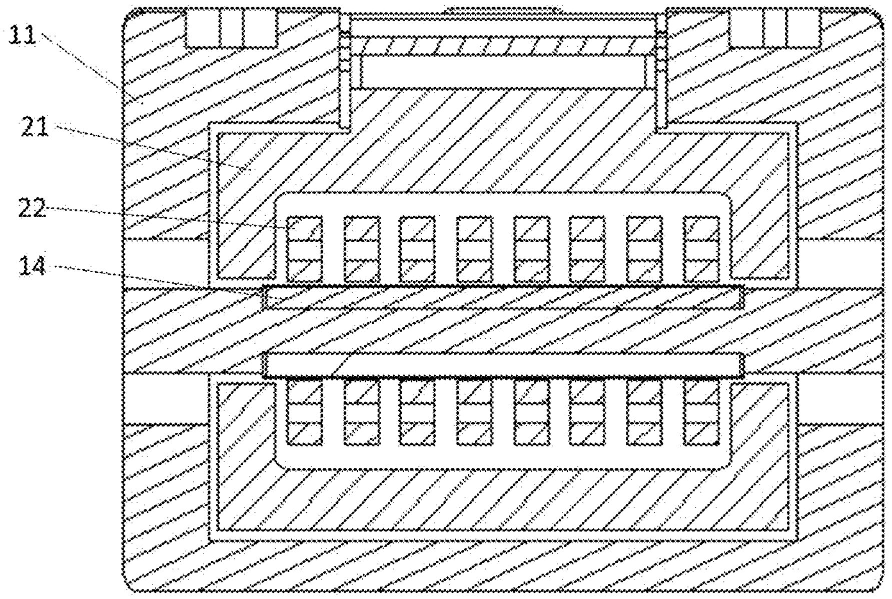
FIG. 12 is a sectional view of the plug connector connected with the socket connector, taken along line F-F of FIG. 11.
Figure 13:
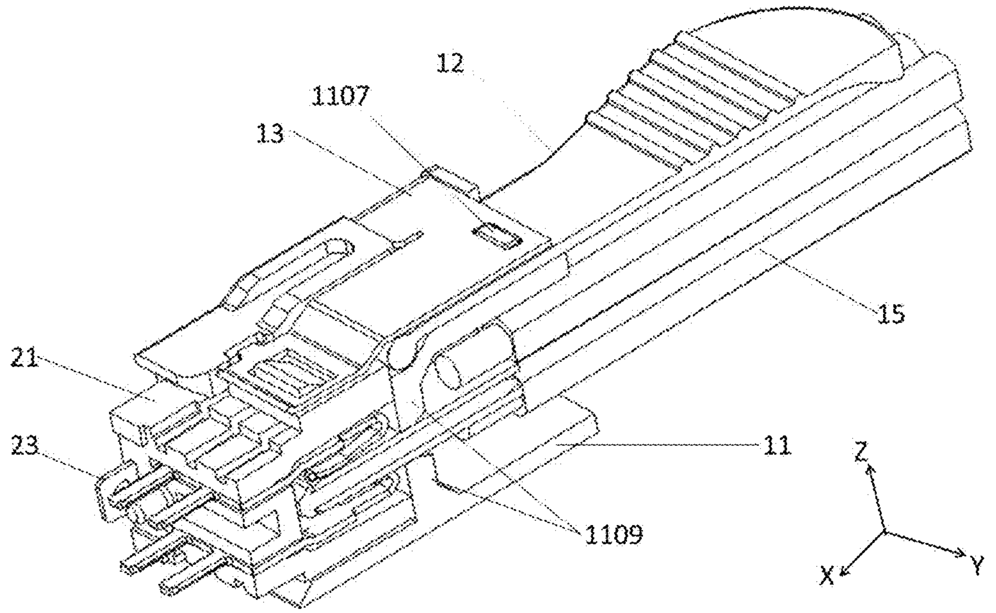
FIG. 13 is a sectional perspective view of the plug connector connected with the socket connector, taken along line D-D of FIG. 11.

In an optional embodiment, the bottom of the connector housing 21 has a recess 2102, as shown in FIG. 9. When molding the connector housing 21, the recess 2102 is provided for material escape, so that the shape and size of the connector housing 21 can be kept consistent.

FIGS. 11 to 15 show a state in which the plug connector 10 according to the present disclosure is connected with the socket connector 20. As shown, when the plug connector 10 is connected with the socket connector 20, the socket connector 20 is inserted into the interior of the plug connector 10, where the end of the socket connector 20 abuts against the position limiting portion 1109 of the plug connector 10, and the connector conductive terminal 22 of the socket connector 20 electrically contacts with the plug conductive terminal 14 of the plug connector 10 to transmit electrical current to the cable 15 of the plug connector 10. The protruding portion 2101 of the socket connector 20 is engaged with the engagement opening 1303 of the connector engagement component 13 of the plug connector 10, so that the plug connector 10 and the socket connector 20 are firmly connected with each other.

Figure 16:
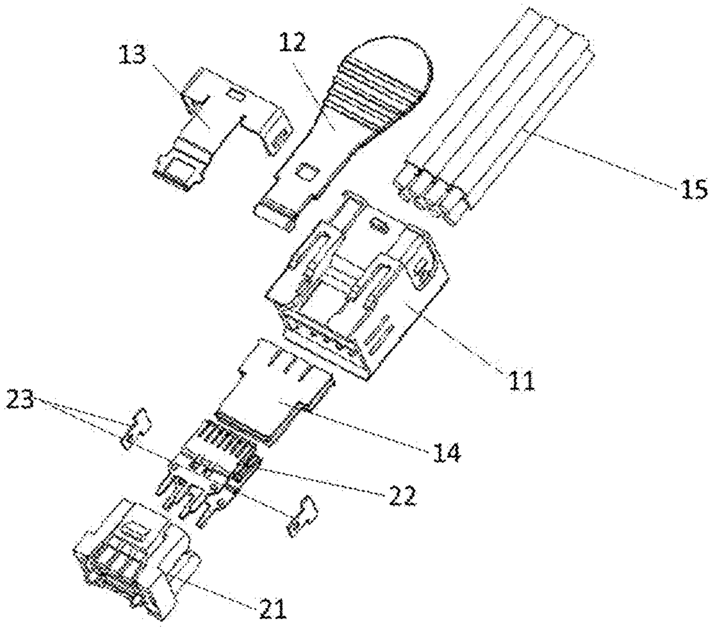
FIG. 16 is an exploded perspective view of a connector assembly according to an embodiment.

FIG. 16 shows an exploded perspective view of a connector assembly according to the present disclosure, including a plug connector 10 and a socket connector 20 capable of mating with the plug connector. The plug connector 10 includes a plug housing 11, a plug conductive terminal 14, a pull tab 12 and a connector engagement component 13. The plug conductive terminal 14 is disposed inside the plug housing 11 and fixedly connected with a cable 15. The connector engagement component 13 includes a fixing portion 1302 detachably fixed to the plug housing 11 and a first engagement portion 1301 extending perpendicularly to the fixing portion, the first engagement portion 1301 being configured to releasably engage with a second engagement portion 2101 of the socket connector 20. The pull tab 12 has a handle-held portion 1201 and a pull tab expanded portion 1202. The pull tab 12 is movable between the outer surface of the plug housing 11 and the inner surface of the connector engagement component 13. By pulling the pull tab 12 in the pulling direction X', the pull tab expanded portion 1202 moves the first engagement portion 1301 of the connector engagement component 13 away from the outer surface of the plug housing 11, thereby releasing the second engagement portion 2101 of the socket connector 20.

The socket connector 20 includes a connector housing 21, a connector conductive terminal 22 and a connector fixing component 23, the connector conductive terminal 22 is arranged inside the connector housing 21, and a pin of the connector conductive terminal 22 is protruded from the connector housing 21 so as to be electrically connected to an external power supply device. In particular, the outer surface of the connector housing 21 is provided with a second engagement portion 2101 such as a protruding portion or a recess, which may engage with a corresponding engagement opening or a protruding portion of the first engagement portion of the plug connector 10.

In the plug connector 10 according to the present disclosure, by the releasable engagement between the connector engagement component 13 of the plug connector 10 and the second engagement portion 2101 of the socket connector 20 mating therewith, the connection between the plug connector 10 and the socket connector 20 can be more stable. By pulling the pull tab 12, the plug connector 10 can be more easily disconnected from the socket connector 20. The connector assembly 1 has good heat dissipation performance and a small overall size, and the joint between the cable 15 and the conductive terminal 14 is firm. Even if a user separates the plug connector 10 from the socket connector 20 by pulling the cable 15 under a special circumstance, the cable 15 will not be separated from the plug conductive terminal 14.

In the connector assembly 1 according to the present disclosure, the socket connector 20 can be electrically connected not only with a connection edge of a card together with a data transmission purpose connector 30, but also with the plug connector 10 of the connector assembly 1, so as to be electrically connected with other devices through the cable 15 of the plug connector 10, thereby significantly improving the application flexibility of the connector assembly 1.

Although various embodiments of the present disclosure have been shown and described, it will be understood by those skilled in the art that changes may be made to these embodiments without departing from the principles and spirit of the present disclosure, the scope of which is defined by the appended claims and their equivalents.

What is claimed is:

1. A plug connector, comprising:

a plug housing having a plurality of side walls including a first side wall, a second side wall, a third side wall, and a fourth side wall, the side walls together forming a cavity;

a spacer having a plate shape and dividing the cavity into a pair of halves;

a plurality of conductive terminals disposed on opposite sides of the spacer, the conductive terminals having a first end adapted to be electrically connected with a cable and a second end adapted to be mated with a socket connector;

a connector engagement component having a first engagement portion releasably engaging a second engagement portion of the socket connector and a fixing portion detachably secured to the side walls of the plug housing, a plurality of lateral protruding portions are provided on sides of the first engagement portion and the first side wall has a guiding recess guiding the lateral protruding portions in a direction away from an outer surface of the plug housing; and a pull tab movable between the plug housing and the connector engagement component in a direction towards or away from the cable, pulling of the pull tab in a pulling direction towards the cable enables release of an engagement between the first engagement portion and the second engagement portion, separating the plug connector from the socket connector.

2. A plug connector, comprising:

a plug housing having a plurality of side walls including a first side wall, a second side wall, a third side wall, and a fourth side wall, the side walls together forming a cavity, at least one of the side walls has at least one ventilation hole;

a spacer having a plate shape and dividing the cavity into a pair of halves;

a plurality of conductive terminals disposed on opposite sides of the spacer, the conductive terminals having a first end adapted to be electrically connected with a cable and a second end adapted to be mated with a socket connector;

a connector engagement component having a first engagement portion releasably engaging a second engagement portion of the socket connector and a fixing portion detachably secured to the side walls of the plug housing; and a pull tab movable between the plug housing and the connector engagement component in a direction towards or away from the cable, pulling of the pull tab in a pulling direction towards the cable enables release of an engagement between the first engagement portion and the second engagement portion, separating the plug connector from the socket connector.

3. A plug connector, comprising:

a plug housing having a plurality of side walls including a first side wall, a second side wall, a third side wall, and a fourth side wall, the side walls together forming a cavity, at least one of the side walls of the plug housing has a glue injection hole;

a spacer having a plate shape and dividing the cavity into a pair of halves;

a plurality of conductive terminals disposed on opposite sides of the spacer, the conductive terminals having a first end adapted to be electrically connected with a cable and a second end adapted to be mated with a socket connector;

a connector engagement component having a first engagement portion releasably engaging a second engagement portion of the socket connector and a fixing portion detachably secured to the side walls of the plug housing; and a pull tab movable between the plug housing and the connector engagement component in a direction towards or away from the cable, pulling of the pull tab in a pulling direction towards the cable enables release of an engagement between the first engagement portion and the second engagement portion, separating the plug connector from the socket connector.

4. A plug connector, comprising:

a plug housing having a plurality of side walls including a first side wall, a second side wall, a third side wall, and a fourth side wall, the side walls together forming a cavity, the plug housing has a plug housing protruding portion formed on the plug housing;

a spacer having a plate shape and dividing the cavity into a pair of halves;

a plurality of conductive terminals disposed on opposite sides of the spacer, the conductive terminals having a first end adapted to be electrically connected with a cable and a second end adapted to be mated with a socket connector;

a connector engagement component having a first engagement portion releasably engaging a second engagement portion of the socket connector and a fixing portion detachably secured to the side walls of the plug housing, the fixing portion has a fixing portion opening engaging with the plug housing protruding portion, a plurality of lateral protruding portions are provided on sides of the first engagement portion and the first side wall has a guiding recess guiding the lateral protruding portions in a direction away from an outer surface of the plug housing; and a pull tab movable between the plug housing and the connector engagement component in a direction towards or away from the cable, pulling of the pull tab in a pulling direction towards the cable enables release of an engagement between the first engagement portion and the second engagement portion, separating the plug connector from the socket connector.

5. The plug connector of claim 4, wherein the first engagement portion has an engagement opening and the second engagement portion has a protruding portion on an outer surface of a connector housing, the first engagement portion releasably engages the second engagement portion in a state in which the plug connector is mated with the socket connector.

6. The plug connector of claim 4, wherein the first engagement portion has a protruding portion and the second engagement portion has a recess provided in a connector housing, the first engagement portion releasably engages the second engagement portion in a state in which the plug connector is mated with the socket connector.

7. The plug connector of claim 4, wherein a position limiting portion is disposed inside the plug housing, the position limiting portion defines an engagement depth between the plug connector and the socket connector.

8. The plug connector of claim 4, wherein at least one of the side walls has at least one ventilation hole.

9. The plug connector of claim 4, wherein the plug connector includes the cable connected with the conductive terminals by welding.

10. The plug connector of claim 4, wherein at least one of the side walls of the plug housing has a glue injection hole.

11. The plug connector of claim 4, wherein a body of the pull tab has a pull tab opening, an outer surface of the first side wall has the plug housing protruding portion positioned in the pull tab opening.

12. The plug connector of claim 11, wherein a size of the pull tab opening in a direction parallel to the pulling direction is greater than a size of the plug housing protruding portion in the direction parallel to the pulling direction.

13. The plug connector of claim 12, wherein the fixing portion opening corresponds to the plug housing protruding portion in size and shape.

14. The plug connector of claim 4, wherein the pull tab has a handle-held portion and a pull tab expanded portion configured to raise up the first engagement portion in a raising direction in response to pulling of the pull tab in the pulling direction towards the cable.

15. The plug connector of claim 14, wherein the first engagement portion is moved away from an outer surface of the plug housing, releasing engagement between the first engagement portion and the second engagement portion.

16. The plug connector of claim 15, wherein the first side wall facing the pull tab has a guiding ramp, a space formed between an outer surface of the guiding ramp facing the pull tab and an inner surface of the connector engagement component is tapered in the pulling direction.

17. The plug connector of claim 16, wherein the pull tab expanded portion is arranged in the space between the outer surface of the guiding ramp and the inner surface of the first engagement portion of the connector engagement component.

18. A connector assembly, comprising:

a plug connector, including:

a plug housing having a plurality of side walls including a first side wall, a second side wall, a third side wall, and a fourth side wall, the side walls together forming a cavity, the plug housing has a plug housing protruding portion formed on the plug housing;

a spacer having a plate shape and dividing the cavity into a pair of halves;

a plurality of conductive terminals disposed on opposite sides of the spacer, the conductive terminals having a first end adapted to be electrically connected with a cable;

a connector engagement component having a first engagement portion and a fixing portion detachably secured to the side walls of the plug housing, the fixing portion has a fixing portion opening engaging with the plug housing protruding portion, a plurality of lateral protruding portions are provided on sides of the first engagement portion and the first side wall has a guiding recess guiding the lateral protruding portions in a direction away from an outer surface of the plug housing; and a pull tab movable between the plug housing and the connector engagement component in a direction towards or away from the cable; and a socket connector matable with the plug connector and including a fixing connection end electrically connected with a circuit board and an engagement end electrically connected with a connection edge of a card, the engagement end is engaged with an end of the plug connector, the first engagement portion releasably engages a second engagement portion of the socket connector, pulling of the pull tab in a pulling direction towards the cable enables release of an engagement between the first engagement portion and the second engagement portion, separating the plug connector from the socket connector.

19. The connector assembly of claim 18, wherein the socket connector has a connector housing and a connector conductive terminal provided in the connector housing, the connector conductive terminal protrudes out from the connector housing to electrically connect with an external power supply device.

20. The connector assembly of claim 19, wherein the socket connector has a connector fixing component embedded in the socket connector and protruding out from the socket connector to fix the socket connector to the circuit board.

* * * * *